United States Patent
Cerwin et al.

(10) Patent No.: US 6,463,202 B1
(45) Date of Patent: Oct. 8, 2002

(54) OPTIMIZATION OF CURVED WAVEGUIDE DESIGN TO REDUCE TRANSMISSION LOSSES

(75) Inventors: Stephen A. Cerwin, San Antonio, TX (US); David B. Chang, Tustin, CA (US)

(73) Assignee: Southwest Research Institute, San Antonio, TX (US)

( * ) Notice: Subject to any disclaimer, the term of this patent is extended or adjusted under 35 U.S.C. 154(b) by 130 days.

(21) Appl. No.: 09/591,084

(22) Filed: Jun. 9, 2000

(51) Int. Cl.[7] ................................................. G02B 6/10
(52) U.S. Cl. ....................................... 385/124; 385/127
(58) Field of Search ................................ 385/126, 127, 385/128, 30, 32, 123, 124, 129

(56) References Cited

U.S. PATENT DOCUMENTS

| | | | |
|---|---|---|---|
| 5,049,175 A | * 9/1991 | Ross et al. | 65/3.11 |
| 5,371,815 A | 12/1994 | Poole | 385/28 |
| 5,526,449 A | 6/1996 | Meade et al. | 385/14 |
| 5,581,649 A | 12/1996 | Paquette et al. | 385/140 |
| 5,604,837 A | 2/1997 | Tanaka | 385/147 |
| 5,841,929 A | 11/1998 | Komatsu et al. | 385/129 |
| 6,178,279 B1 | * 1/2001 | Mukasa et al. | 385/123 |
| 6,327,279 B1 | * 12/2001 | Heine | 372/6 |

* cited by examiner

*Primary Examiner*—Cassandra Spyrou
*Assistant Examiner*—Euncha Cherry
(74) *Attorney, Agent, or Firm*—Baker Botts L.L.P.

(57) ABSTRACT

A waveguide designed to minimize bend-induced losses. The waveguide has three regions of varying indices of refraction. The indices of refraction are chosen so that the field is a trigonometric function in the core region, evanescent in the intermediate region, and trigonometric again in the outer region. The widths of each region are calculated to further reduce losses.

22 Claims, 2 Drawing Sheets

OPTIMIZATION OF CURVED WAVEGUIDE DESIGN TO REDUCE TRANSMISSION LOSSES

TECHNICAL FIELD OF THE INVENTION

This invention relates to waveguides, and more particularly to designing curved waveguides so as to minimize bend-induced transmission losses.

BACKGROUND OF THE INVENTION

A "waveguide" can be generally defined as a structure that transmits electromagnetic waves from one point to another. As compared to transmission in an unbounded medium, transmission in a waveguide limits wave intensity to a finite cross section and may guide the wave along a path that is not straight. A waveguide may be a parallel plate type waveguide, or may be any rectangular or circular "pipe" that confines and guides electromagnetic waves between two locations.

Waveguides may be designed to carry waves of any wavelength, commonly, radio frequency or optical frequency waves. For optical frequencies, reflection off an interface from an optically dense medium to one that is less dense provides a means to guide waves. Dielectric waveguides in integrated circuitry and optical fibers have found important applications for optical frequencies.

Practically all transmission, communication, and sensor systems that use waveguides have one or more bends in the waveguides. The bends are present to accommodate the systems to particular geometries, to reduce size, or because of the requirements imposed by the physics of operation. As an example of the latter case, a Sagnac interferometer requires enclosure of an area by the waveguide.

In general, curvature in a waveguide introduces intrinsic losses due to radiation. Intuitively, this can be understood because any attempt to force a wavefront to travel around a curve results in phase velocities at large radii that exceed the velocity of light. This results in the imposition of a radial component to the direction of propagation of the wavefront at large radii, i.e. there will be outward radiation. These losses set limits on system sensitivity for a given electromagnetic source, because the signal amplitude at a detector is decreased. It also places a lower limit on system size, because radiation losses increase as the radius of curvature decreases.

In conventional microwave waveguides that are completely enclosed by conducting boundaries, these "bend-induced" radiation losses are prevented. However, the enclosure introduces additional transmission losses due to the eddy currents in the skin depth surface layer of the conductor. In optical waveguides, the conducting reflecting boundary is usually absent, and the radiation losses can be dominant.

Much of the reported work in modeling bend-induced radiation losses involves numerical approximations. The methods employed include Fourier decomposition, finite element analysis, point matching of amplitudes and derivatives at boundaries between different regions, matching of Fourier coefficients at boundaries, replacing derivatives by finite differences, beam propagation, variational approximations, reciprocity techniques, and various modal expansion and perturbation approaches.

SUMMARY OF THE INVENTION

One aspect of the invention is a curved waveguide for minimizing bend-induced radiation losses of a guided wave. The waveguide has three regions, a core region and two regions outside the core. The index of refraction of each region is calculated so that the electromagnetic field within the waveguide has certain characteristics. Specifically, in the core region, the field is trigonometric. In the intermediate region, the field is hypertrigonometric, i.e., evanescent. In the outer region, the field is trigonometric but with an amplitude smaller than in the core region. Further calculations are used to calculate the boundaries between adjacent regions, and hence the width of each region, so as to further minimize losses.

An advantage of the invention is that the curved waveguide can be designed to minimize losses. One design feature is the use of three regions of varying indices of refraction. A core, as well as two different regions outside the core, are used. For each region, the index of refraction and the width of the region is designed to "shape" the electromagnetic field within the waveguide such that electromagnetic energy is contained primarily in the core region of the waveguide. Additionally, a reflector in the outermost region, where the wave amplitude is very small, minimizes skin depth losses.

DETAILED DESCRIPTION OF THE INVENTION

Figure 1A:
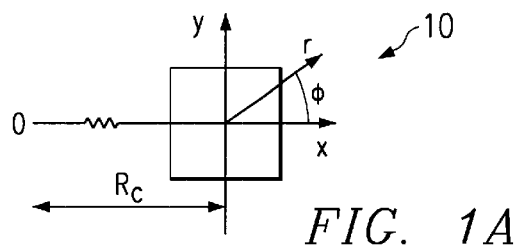
FIG. 1A is a cross sectional view of the core region of a curved waveguide.

The following description addresses the problem of "direct bend" radiation losses. It does not address two other losses associated with curved waveguides: transition losses and surface scattering losses. Transition loss occurs at the transition between the bent waveguide and a straight waveguide. Part of this loss is associated with the fact that the maximum field (for the fundamental mode) shifts slightly from the center of the waveguide to larger radii. When the bent waveguide is mated to a straight waveguide, this offset results in reflection at the interface. Surface scattering loss is due to inhomogeneities, especially at interfaces. Interface roughness leads to scattering losses.

As explained below, direct bend losses (also referred to herein as "bend-induced" losses) can be minimized by using certain criteria when designing the curved waveguide. These criteria can be established using numerical approximations to model various waveguide characteristics and to calculate design parameters. One such parameter is a radius-of-curvature-dependent spatial variation of the index of refraction. Another is the calculation of the location of a "radiation caustic" relative to the cross section of the waveguide. These and other parameters are described below.

The following description uses terms, such as refraction index, typically associated with optical waveguides.

However, the concepts described herein are broadly applicable to waveguides for any electromagnetic propagation. For example, the invention may be applied to waveguides for microwaves or infrared waves. In general, a refractive index, n, may be expressed for transmission characteristics of materials for any frequency:

$$n^2 = \epsilon\mu/\epsilon_0\mu_0$$

where $\epsilon$ is dielectric permittivity and $\mu$ is magnetic permeability.

Mathematical Modeling

In bent optical waveguides used for practical applications, the radius of curvature is usually much larger than the width of the waveguide. With this assumption, a straight waveguide approximation has been developed for a curved waveguide.

Moreover, where the difference in the indices of refraction of the core and of the cladding is very small, a weak-guidance approximation permits uncoupling of the equations for the different field components. A "profile height", $\Delta$, for a given waveguide is defined as:

$$\Delta = [n_{co}^2 - n_{cl}^2]/2n_{co}^2 \rightarrow [n_{co} - n_{cl}]/n_{co} \quad [1]$$

when $\Delta \ll 1$, and where $n_{co}$ is the index of refraction of the core and $n_{cl}$ is the index of refraction of the cladding.

With these assumptions (the weak-guidance approximation that applies when $\Delta \ll 1$ and the fact that the radius of curvature is much larger than the width of the waveguide), the Maxwell equations reduce in the lowest approximation to a simple scalar wave equation.

For a straight waveguide, the Maxwell equation is:

$$[\nabla^2 + k^2 n^2(x,y) - \beta^2]\Phi(x,y) = 0 \quad [2]$$

where $\Phi(x,y)$ represents the x and y varying portion of a component of the guided electromagnetic field, and it is assumed that the time and z dependence of the field component is given by $\exp[i(\omega t - \beta z)]$. In Equation [1], x and y are Cartesian coordinates perpendicular to the axis of the waveguide (the z-direction), $\nabla^2$ denotes a transverse Laplacian operator, k ($k = 2\pi/\lambda = \omega/c$) is the free space wavenumber, n(x,y) is the position-dependent index of refraction, and $\beta$ is the axial wavenumber. Equation [2] applies to waveguides having rectangular or circular cross sections, although the geometry affects the form of the Laplacian operator.

For curved waveguides, Equation [2] may be the basis for deriving an approximate mathematical model. When the waveguide is curved with a radius of curvature, R, that is large compared to the dimension of the waveguide, the scalar wave equation of Equation [2] is modified slightly, due to the fact that the wavefront is constantly changing direction. If $\theta$ denotes the azimuthal angle that describes the position along the waveguide in the plane perpendicular to the axis about which the waveguide is bent, then the wavefront variation is no longer strictly given by $\exp[-i\beta z]$, but rather by $\exp[-i\beta_\theta]$.

Figure 1B:
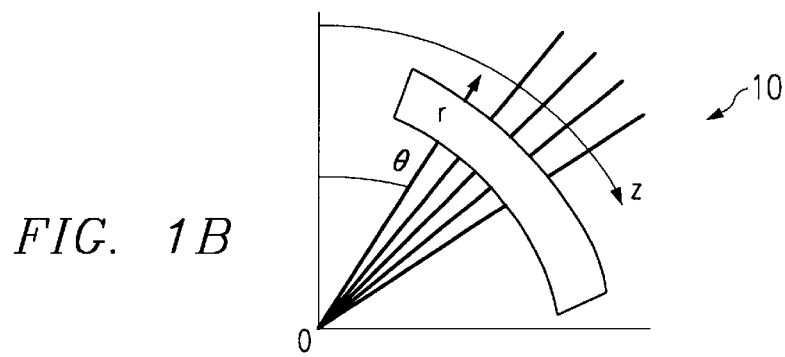
FIG. 1B illustrates the plane of the curve of the waveguide of FIG. 1A.

FIGS. 1A and 1B are two views of the core 10 of a curved waveguide, and illustrate a cross section of the core and the plane of its curve, respectively. If the radius of curvature of the center of the waveguide is denoted by $R_c$ and any arbitrary point in the waveguide cross section is given by polar coordinates (r, $\phi$), where r is measured from the axis of the waveguide (the center of core 10), then z is approximately:

$$z = R_c + r \cos \Phi \quad [3]$$

A local propagation constant can be introduced as follows:

$$B_L = \beta R_c/[R_c + r \cos \Phi] \rightarrow \beta[1 + (r/R_c)\cos \Phi] \quad [4]$$

when $r/R_c \ll 1$. If the above is inserted into Equation [2], the result is:

$$[\nabla^2 + k^2 n^2_{eff}(x,y) - \beta^2]\Phi(x,y) = 0 \quad [5]$$

Figure 2:
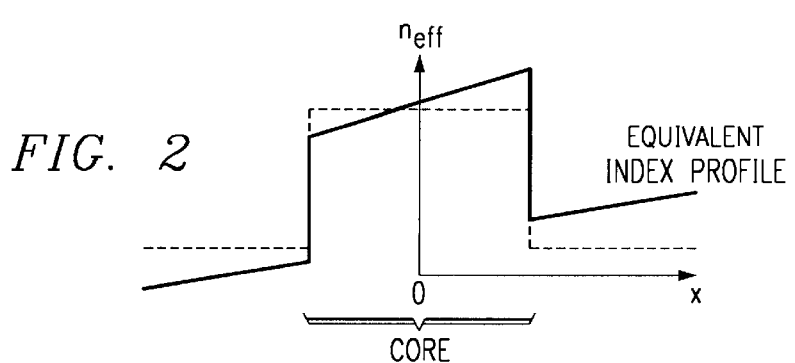
FIG. 2 illustrates the effective index of refraction for a curved waveguide.

FIG. 2 illustrates the effective index, $n_{eff}$, for a curved waveguide with a constant index of refraction at the core. The index for the same waveguide, if it were straight, is illustrated in dotted lines. Values of x are relative to the center of the core.

As illustrated in FIG. 2, a straight waveguide has a large n in the core and a smaller n in the cladding. As further illustrated, a bent waveguide can be regarded as a straight waveguide with an equivalent index profile, relative to the cross section of the bent waveguide, with a x-axis lying in the plane of the bend.

The effective index for a curved waveguide, as shown in FIG. 2, may be mathematically represented as follows:

$$n^2_{eff} = n^2(x,y) + n^2_{co}(r/R_c)\cos \Phi \quad [6]$$

where $r/R_c \ll 1$.

EXAMPLES

The following examples illustrate the types of behavior predicted by Equations [5] and [6].

Example 1 is of a straight slab waveguide (no variation of index in the y direction) with a constant index of refraction, $n_{core}$, in the core region (where $|x| < a$), and constant index, $n_{cladding}$, in the cladding region (where $|x| > a$). A guided wave with no radiation losses is characterized by the following conditions:

Core: $k^2 n^2_{co} - \beta^2 > 0$

Cladding: $k^2 n^2_{cl} - \beta^2 < 0$

These are desired conditions, where $\phi$ is a trigonometric function in the core region, while at the same time being an evanescent function in the cladding region. The terms "trigonometric" and "evanescent" are used herein in their common sense to describe function profiles, with the former being sin or cosine in form and the latter being characterized by a decay toward zero.

For a given core index, $n_{core}$, and a given cladding index, $n_{cladding}$, the propagation constant $\beta$ is determined from the wave equation by matching $\phi$ and $d\phi/dx$ at the interface between the core and the cladding (where $|x| = a$). In general, a real value for $\beta^2$ will not be obtainable for an arbitrary free space wavenumber k. This then defines a lower frequency cutoff for the waveguide. An upper frequency cutoff may be defined if it is desired that the waveguide support only a single mode.

If, instead of the above condition in the cladding region, the following condition exists:

$$k^2 n^2_{cl} - \beta^2 > 0$$

then $\phi$, instead of being evanescent in the cladding region, would be trigonometric, as in Region 1. If there is no reflection at the cladding region, then this trigonometric function represents an outgoing wave. This corresponds to undesirable radiation loss from the waveguide.

Example 2 is of a curved slab waveguide (no variation of index in the y direction). As in Example 1, the waveguide is assumed to have a constant index of refraction, $n_{core}$, in the core region and a constant index of refraction, $n_{cladding}$, in the cladding region. Again, for a guided wave to exist in the core region, we require a core region in which $k^2 n^2_{co} - b^2 > 0$ so that in the core region, $\phi$ will be trigonometric.

For Example 2, unlike the straight waveguide of Example 1, as x increases in magnitude, the $(r/R_c)\cos\Phi$ term in the effective index of refraction expression means that $\phi$ will be a trigonometric function as x gets very large. If there is no reflection at large x, this trigonometric function will be an outgoing wave, representing radiation loss from the waveguide. How much radiation loss this outgoing wave describes depends on what happens at an intermediate region. Thus, curved waveguides may be modeled in terms of three regions, instead of the conventional two regions (core and cladding). These regions are defined as Region 1, Region 2, and Region 3, with Region 2 being an intermediate region.

Figure 3:
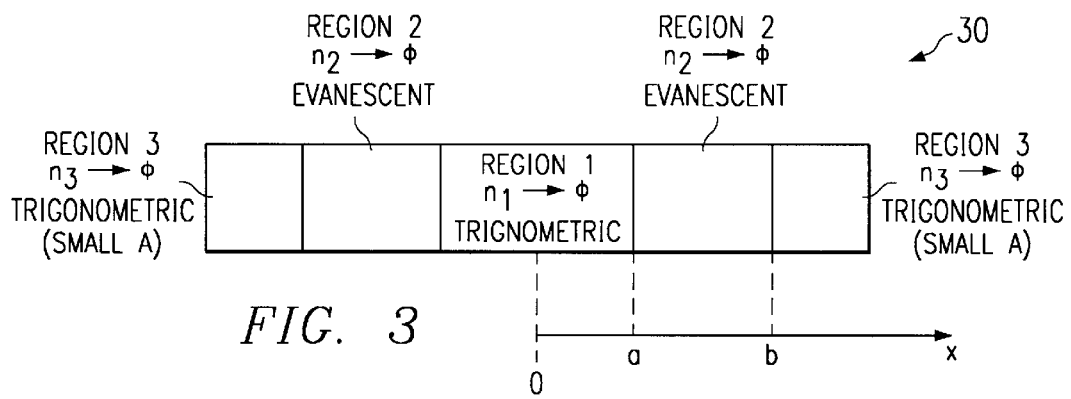
FIG. 3 illustrates a slab curved waveguide having three regions in accordance with the invention.

FIG. 3 illustrates a cross section of curved slab waveguide 30, which has a core region, an intermediate region, and an outer region in accordance with the invention. For a slab waveguide, these regions are defined in terms as "half widths" on each side of the waveguide axis at x=0. Each half width is some value of $|x|$. In Region 1 (the core), $|x|<a$. In Region 2 (the intermediate region), $a<|x|<b$. In Region 3 (the outer region), $b<|x|$.

The boundaries between regions are determined by changes in the index of refraction. In the example of FIG. 3 these changes are abrupt. The boundary between Region 1 and Region 2 is at a, where the index of refraction decreases to cause the field function to become evanescent. The boundary between Region 2 and Region 3 is at b, where the index of refraction increases to cause the field function to become trigonometric again. As explained below, a specific boundary can be placed at $b=x_R$, where $k^2 n_{eff}^2(x,y) - \beta^2$ changes sign due to the increasing $(r/R_c)\cos\phi$ term. The value of $|x|=x_R$ at which this occurs defines a "radiation caustic".

In a "good" waveguide 30, the following conditions exist:

Region 1  $k^2 n_{core}{}^2 - \beta^2 > 0$

Region 2  $k^2 n_{eff}{}^2(x, y) - \beta^2 < 0$

Region 3  $k^2 n_{eff}{}^2(x, y) - \beta^2 > 0$

With these conditions, as illustrated in FIG. 3, $\phi$ is an evanescent function in Region 2. The amplitude of the outgoing radiation in Region 3 is much less than the amplitude of the guided wave in the core region. This is desirable, because the radiation loss will be smaller. In order for the function to be strongly evanescent in Region 2, the trigonometric function in Region 1 must have an appreciable negative slope at the interface with Region 2. For a given $n_{core}$ this will occur only if the half-width, a, of the core region is sufficiently large. If the half-width is not large enough, then the amplitude in Region 2 can be appreciable. In addition, for an evanescent wave to decrease the amplitude appreciably in Region 2, the width of Region 2 must be large compared to the e-folding length of $\phi$ in Region 2. In other words, the width of Region 2 is long compared to the distance that $\phi$ has an appreciable decrease.

If waveguide 20 were a lossy waveguide, the conditions of FIG. 3 might be as follows:

Region 1  $k^2 n_{core}^2 - \beta^2 > 0$

Region 2  $k^2 n_{eff}^2(x, y) - \beta^2 > 0$

Region 3  $k^2 n_{eff}^2(x, y) - \beta^2 > 0$

Here, the magnitude of $\phi$ is trigonometric in all three regions, and there is no opportunity for the amplitude to decrease appreciably before Region 3. Large radiation loss will occur.

For both of the above examples, the solution for $\phi$ at large x (Region 3) is trigonometric. If there is no reflector in the outer region, this represents radiation loss from the waveguide. On the other hand, we can prevent this radiation loss by providing a reflector in Region 3. This will modify the dispersion relation for $\beta^2$, but the modification will be slight because of the small amplitude of $\phi$ at the reflector.

Although the foregoing examples are for a slab waveguide, in which there is no variation of properties in the y direction, the same type of results hold for a waveguide in which the wave is contained to a finite range of y values. Thus, if the energy is confined to a width w in the y direction, then an approximate result can be obtained from the slab examples by replacing $\beta^2$ with the following:

$$\beta^2_{eff} = \beta^2 + (\pi/w)^2 \qquad [7]$$

Waveguide Design Criteria

The above examples illustrate three objectives for minimizing radiation bending losses: containing as much of the guided energy in the core region as possible, assuring that the index of refraction decreases sufficiently from the core to the cladding region that an intermediate evanescent region exists, and preventing the outgoing bend-induced radiation from escaping.

These objectives provide guidelines for designing a single mode waveguide with minimal bend-induced radiation losses. Five guidelines are discussed below. The extension to a multimode waveguide is straightforward.

A first guideline is for the waveguide to have three regions, which will promote alternating types of transverse variation of the field, $\phi$. A spatial variation of the index of refraction, n, is selected so that three regions of $\phi$ exist. Thus, the waveguide has three regions of different n: a core region, an intermediate region, and an outer region. In the core region and in the outer region, the spatial variation of $\phi$ is trigonometric. In the intermediate region, the spatial variation of $\phi$ is hypertrigonometric, i.e., evanescent. The desired variation of n consists of a large index in the core region, a smaller index in an intermediate region, and a large index again in the outer region. The quantitative conditions are given by (straightforward generalization for general spatial variation of) the defining conditions of the waveguide described above in connection with FIG. 3. The variation of the index of refraction confines most of the waveguide energy to radii where the resultant wavefront does not have an appreciable radial component, i.e. to radii where there is little outward radiation propagation.

A second guideline is to assure appreciable transverse phase change of the field, $\phi$, in Region 1 (the core). For a given magnitude of the index of refraction in the core, the width of the core is adjusted so that $\phi$ will experience a phase change across the core sufficient to make the slope, $d\phi/dx$, appreciable at the boundary with Region 2. Allowing for spatial variation of the index, we can estimate the width required by the WKB condition:

$$\int a\, dx = \pi/2 \qquad [8]$$

where $$a^2 = k^2 n^2_{eff}(x,y) - \beta^2_{eff} \quad [9]$$

for x inside the core. The limits of the integral are over the width, a, of the core, where $a^2 > 0$. If only a single mode is to be supported, it is required further that there be no solution for:

$$\int a\, dx = dx = 3\pi/2 \quad [10]$$

which is the next allowable WKB solution. This can be achieved by placing an upper limit on the core width, a.

A third guideline is to assure a large decrease in the amplitude of the transverse evanescent field in Region 2. In Region 2, there is a low value of the index of refraction. This makes the value of the evanescent damping constant $\gamma$ as large as possible, where $$\gamma^2 = -k^2 n^2_{eff}(x,y) + \beta^2_{eff} \quad [11]$$

for x outside the core. A low value of n in this cladding region also gives a wide evanescent region, because the radiation caustic at which the evanescent function changes once again into a trigonometric function occurs at the $x_R$ that satisfies the following condition:

$$n_{co}^2 (r/R_c) \cos \phi = -n^2(x_R, y) + \beta^2_{eff}/k^2 \quad [12]$$

A fourth guideline is to assure further decrease in field amplitude outside of the radiation caustic. The combination of the foregoing conditions assures that the field leaking into Region 3 will have a small amplitude. The WKB amplitude of the outgoing radiation in Region 3 is proportional to $a^{-\frac{1}{2}}$. With a given by Equation [9], this suggests making the index of refraction in Region 3 larger than in Region 2 to further reduce the radiation amplitude.

A fifth guideline is to assure containment of the radiation by using reflection outside of the radiation caustic. To reduce the losses further, a reflector is placed in Region 3 to contain the radiation. This can be in the form of a dielectric material or in the form of a conducting mirror. For optical wavelengths, for instance, the latter could be a coating of tin oxide of only a few hundred angstrom thickness. Generally, it is desirable to avoid the use of metallic reflectors in long waveguides due to the losses associated with the eddy currents within a skin depth of the surface. However, since these mirrors are placed in the outer region, where the radiation amplitude is already small by design, skin depth losses are minimized.

Figure 4:
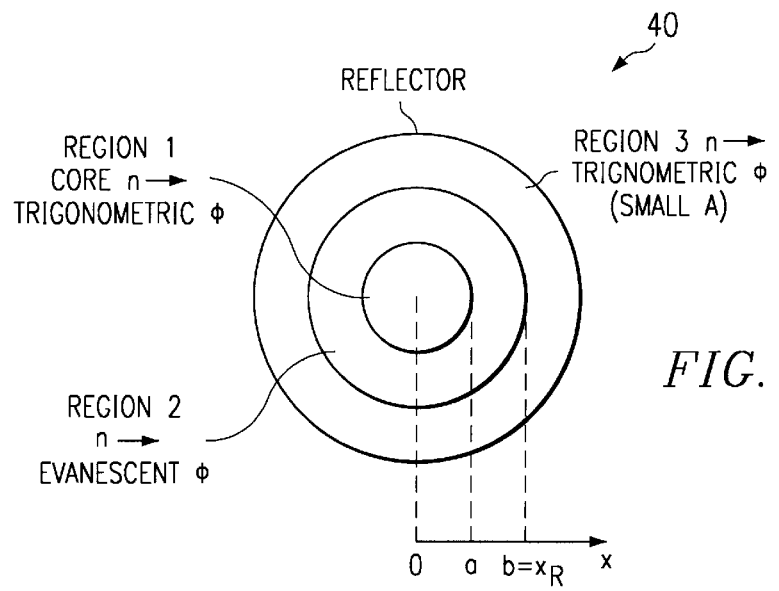
FIG. 4 Illustrates a circular curved waveguide having three regions in accordance with the invention.
Figure 5:
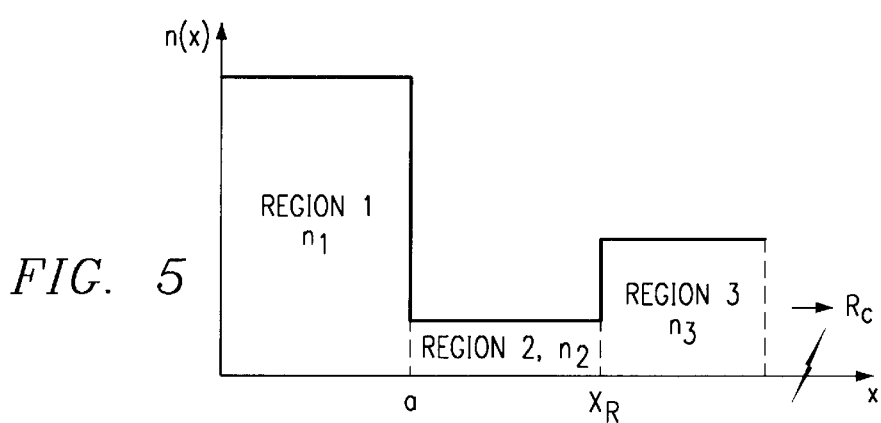
FIG. 5 illustrates an example of the spatial variation of the index of refraction for the waveguides of FIGS. 3 and 4.

FIG. 4 illustrates a cross sectional area of a curved waveguide 40 designed in accordance with the above guidelines. FIG. 5 illustrates the relative indices of refraction of the three regions. The desired profile of the index of refraction, n, is one where n is large in Region 1, small in Region 2, and larger again in Region 3. Reflector 41 prevents residual radiation from escaping the waveguide 40. Reflector 41 introduces only minimal skin depth loss because of the reduced radiation amplitude in Region 3.

Figure 6:
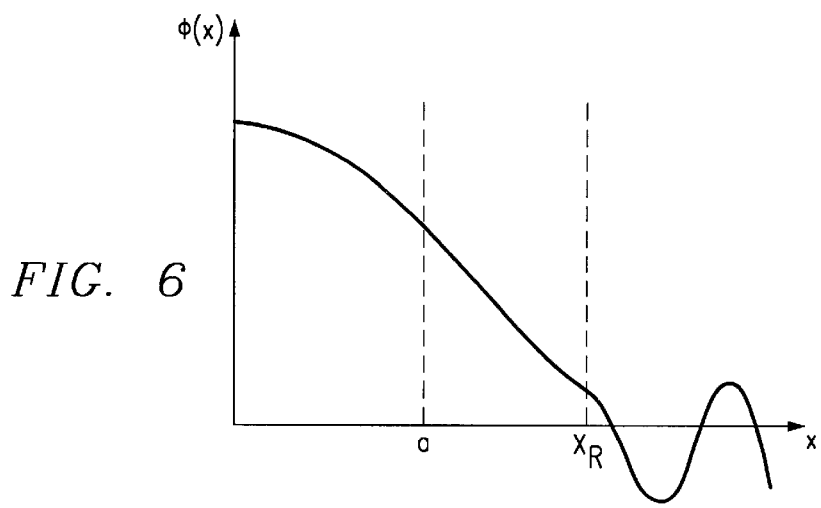
FIG. 6 illustrates an example of the electromagnetic field function variation for the waveguides of FIGS. 3 and 4.

FIG. 6 illustrates the relative amplitudes of $\phi$, which is trigonometric in Region 1, evanescent in Region 2, and trigonometric in Region 3. The value of x at which the boundaries between the regions are calculated as described above, such that the slope of $\phi$ is steep at a, and such that $x_R$ occurs where $\phi$ has substantially decreased in amplitude.

Although the above discussion is in terms of an index of refraction that is constant in each region, this is not a necessary condition. Within each region, n might vary and the above-described conditions for a "good" waveguide could still be met.

The above described guidelines apply to waveguides of all cross sectional geometries—circular, rectangular, and slab. A waveguide on an integrated circuit is akin to a "slab" in the sense that it is typically wider than it is high. Like a slab waveguide, the dimension of interest for each region is the dimension in the plane of the slab. Referring again to FIGS. 3 and 4, regardless of the cross sectional geometry, Region 2 can be said to "surround" Region 1, and Region 3 can be said to "surround" Region 2.

Other Embodiments

Although the present invention has been described in detail, it should be understood that various changes, substitutions, and alterations can be made hereto without departing from the spirit and scope of the invention as defined by the appended claims.

What is claimed is:

1. A curved waveguide for minimizing bend-induced radiation losses of a guided wave, said wave having an electromagnetic field with a transverse field amplitude, comprising:
   a core region in which the spatial variation of the field is trigonometric;
   an intermediate region surrounding the core region, in which the spatial variation of the field is hypertrigonometric; and
   an outer region surrounding the intermediate region, in which the spatial variation of the field is trigonometric;
   wherein the core has a width calculated such that the slope of the field amplitude is negative at the boundary between the core region and the intermediate region.

2. The waveguide of claim 1, wherein the field magnitude is smaller in the outer region than in the core region.

3. The waveguide of claim 1, wherein the field is evanescent in the intermediate region.

4. The waveguide of claim 1, in which the variations of the field are accomplished by making the core region and the outer region of material having a larger index of refraction than that of the intermediate region.

5. The waveguide of claim 1, wherein the slope is substantially steep.

6. The waveguide of claim 1, wherein the boundary between the intermediate region and the outer region is calculated such the field amplitude is substantially decreased at that boundary.

7. The waveguide of claim 1, wherein the half width of the intermediate region is calculated such that it is large relative to the e-folding length of the field in the intermediate region.

8. The waveguide of claim 1, further comprising a reflector layer outside the outer region.

9. The waveguide of claim 1, wherein the index of refraction is constant in at least one region.

10. The waveguide of claim 1, wherein the index of refraction varies within at least one region.

11. The waveguide of claim 1, wherein the boundary between the intermediate region and the outer region represents a distance from the axis of the waveguide where the effective index of refraction is modeled with a cosine term and causes the field amplitude to change sign.

12. A method of designing a curved waveguide so as to minimize bend-induced radiation losses of a guided wave, said wave having an electromagnetic field with a transverse field amplitude, comprising the steps of:
   modeling the waveguide as having three regions of varying indices of refraction, each having a half-width relative to the axis of the waveguide;

calculating the index of refraction of a core region such that the spatial variation of the field is trigonometric in that region;

calculating the index of refraction of an intermediate region surrounding the core region, such that the spatial variation of the field is hypertrigonometric; and calculating the index of refraction of an outer region surrounding the intermediate region, such that the spatial variation of the field is trigonometric;

calculating the width of the core such that the slope of the field amplitude is negative at the boundary between the core region and the intermediate region.

13. The method of claim 12, wherein the field amplitude is smaller in the outer region than in the core region.

14. The method of claim 12, wherein the field is evanescent in the intermediate region.

15. The method of claim 12, in which the variations of the field are accomplished by making the core region and the outer region of material having a larger index of refraction than that of the intermediate region.

16. The method of claim 12, wherein the slope is substantially steep.

17. The method of claim 12, wherein the boundary between the intermediate region and the outer region is calculated such the field amplitude is substantially decreased at that boundary.

18. The method of claim 12, wherein the width of the intermediate region is calculated such that it is large relative to the e-folding length of the field in the intermediate region.

19. The method of claim 12, further comprising a reflector layer outside the outer region.

20. The method of claim 12, wherein the index of refraction is constant in at least one region.

21. The method of claim 12, wherein the index of refraction varies within at least one region.

22. The method of claim 12, wherein the boundary between the intermediate region and the outer region represents a distance from the axis of the waveguide where the effective index of refraction is modeled with a cosine term and causes the field amplitude to change sign.

* * * * *